(12) United States Patent
Clad et al.

(10) Patent No.: US 11,240,150 B2
(45) Date of Patent: Feb. 1, 2022

(54) APPLYING ATTESTATION TO SEGMENT ROUTING

(71) Applicant: Cisco Technology Inc., San Jose, CA (US)

(72) Inventors: Francois Clad, Strasbourg (FR); Pablo Camarillo Garvia, Madrid (ES); Clarence Filsfils, Brussels (BE)

(73) Assignee: CISCO TECHNOLOGY, INC., San Jose, CA (US)

(*) Notice: Subject to any disclaimer, the term of this patent is extended or adjusted under 35 U.S.C. 154(b) by 52 days.

(21) Appl. No.: 16/781,838

(22) Filed: Feb. 4, 2020

(65) Prior Publication Data

US 2020/0322266 A1   Oct. 8, 2020

Related U.S. Application Data

(60) Provisional application No. 62/829,498, filed on Apr. 4, 2019, provisional application No. 62/829,494, filed on Apr. 4, 2019, provisional application No. 62/829,574, filed on Apr. 4, 2019, provisional application No. 62/829,492, filed on Apr. 4, 2019, provisional application No. 62/829,580, filed on Apr. 4, 2019.

(51) Int. Cl.
| | |
|---|---|
| *H04L 12/18* | (2006.01) |
| *H04L 12/723* | (2013.01) |
| *H04L 29/06* | (2006.01) |
| *H04L 12/741* | (2013.01) |
| *G06F 21/60* | (2013.01) |

(52) U.S. Cl.
CPC ............ *H04L 45/50* (2013.01); *G06F 21/602* (2013.01); *H04L 45/74* (2013.01); *H04L 69/22* (2013.01)

(58) Field of Classification Search
CPC ....... G06F 21/602; G06F 21/57; H04L 45/50; H04L 69/22; H04L 45/74; H04L 45/34; H04L 63/0853
See application file for complete search history.

(56) References Cited

U.S. PATENT DOCUMENTS

| | | | |
|---|---|---|---|
| 10,735,197 B2 * | 8/2020 | Sundaresan | ........... H04L 9/3239 |
| 10,769,635 B2 * | 9/2020 | Lindemann | ........ G06K 9/00261 |
| 2016/0072708 A1 * | 3/2016 | Field | ...................... H04L 45/64 370/221 |

(Continued)

OTHER PUBLICATIONS

Endpoint Trust-based Traffic Management, ip.com West Journal, ip.com Inc, West Henrietta, NY, US, Oct. 31, 2017 (Oct. 31, 2017), XP013176242, and ISSN: 1533-0001 sections Approach, Layer 3 and Assertion Tokens (Year: 2017).*

(Continued)

*Primary Examiner* — Lan-Huong Truong
(74) *Attorney, Agent, or Firm* — Baker Botts, LLP

(57) ABSTRACT

In one embodiment, a method by an apparatus of a segment routing (SR) network includes receiving a data packet and accessing an attestation token for the apparatus. The method further includes determining a location within a header of the received data packet for the attestation token and creating an updated header by encoding the attestation token in the determined location of the header. The method further includes sending the updated header with the encoded attestation token to another apparatus of the SR network.

17 Claims, 9 Drawing Sheets

(56) References Cited

U.S. PATENT DOCUMENTS

2018/0324090 A1* 11/2018 Duncan ............... H04L 12/4641

OTHER PUBLICATIONS

PCT Notification of Transmittal of the Intl. Search Report and the Written Opinion of the Intl. Searching Authority, or the Declaration, re PCT/US2020/026358, dated Jul. 21, 2020.
David T. Shoneman, Ip.com, "Endpoint Trust-Based Traffic Management," an IP.com Prior Art Database Technical Disclosure, Copyright 2017 CTM Insights All rights reserved, Oct. 31, 2017.
"Border Gateway Protocol Link-State," *Border Gateway Protocol Link-State* https://www.cisco.com/c/en/Id/doc/ios-xml/ios/iproute_bgp/configuration/xe-16/irg-xe-16-book/bgp-ls.pdf, Downloaded Sep. 26, 2019.
Gredler, et al., "North-Bound Distribution of Link-State and Traffic Engineering (TE) Information Using BGP," *Internet Engineering Task Force (IETF)* https://tools.ietf.org/html/rfc7752, Downloaded Sep. 26, 2019.
"SDN Workshop," *APNIC*, WSDN01_vO.1. https://wiki.apnictraining.net/_media/apnic46-sdn/wsdn01_-_module_4_-_bgp-ls_-_v1.0.pdf, Downloaded Sep. 26, 2019.
Diptanshu Singh, "Yet Another new BGP NLR1:BGP-LS," https://packetpushers.net/yet-another-new-bgp-nlri-bgp-ls/, Downloaded Sep. 26, 2019.
"IP Routing: BGP Configuration Guide," updated Feb. 13, 2017. https://www.cisco.com/c/en/us/td/docs/ios-xml/ios/iproute_bgp/configuration/xe-16/irg-xe-16-book/irg-xe-16-book_chapter_01010101.html, Downloaded Sep. 26, 2019.
Toni R. Farley, et al., "A Survey of BGP Security Issues and Solutions," *IEEE/ACM Transactions on Networking*, Jan. 2004.
Michael J. Ham, "BGP Route Attestation: Design and Obsrvation Using IPV6," Dakota State University, Beadle Scholar, Masters Theses & Doctoral Dissertations, Spring Mar. 1, 2017.
Stephen T. Kent, "Securing the Border Gateway Protocol," *The Internet Protocol Journal*, Sep. 2003.
Rosen, et al., "MPLS Label Stack Encoding.", Jan. 2001.
Clad et al., "Service Programming with Segment Routing draft-ietf-spring-sr-service-programming-01.", Nov. 4, 2019.
Clad et al., "Service Programming with Segment Routing draft-xuclad-spring-sr-service-programming-00.", Jul. 2, 2018.
Andersson, et al., "LDF Specification.", Oct. 2007.
Awduche, et al., "RSVP-TE: Extensions to RSVP for LSP Tunnels.", Dec. 2001.
Bashandy, et al., "RFC 8660 Segment Routing with the MPLS Data Plane.", Dec. 2019.
Deering and Hinden, "Internet Protocol, Version 6 (IPv6) Specification.", Jul. 2017.

* cited by examiner

APPLYING ATTESTATION TO SEGMENT ROUTING

PRIORITY

This application claims the benefit, under 35 U.S.C. § 119(e), of U.S. Provisional Patent Application No. 62/829,498, filed 4 Apr. 2019, which is incorporated herein by reference in its entirety. This application claims the benefit, under 35 U.S.C. § 119(e), of U.S. Provisional Patent Application No. 62/829,494, filed 4 Apr. 2019, which is incorporated herein by reference in its entirety. This application claims the benefit, under 35 U.S.C. § 119(e), of U.S. Provisional Patent Application No. 62/829,574, filed 4 Apr. 2019, which is incorporated herein by reference in its entirety. This application claims the benefit, under 35 U.S.C. § 119(e), of U.S. Provisional Patent Application No. 62/829,492, filed 4 Apr. 2019, which is incorporated herein by reference in its entirety. This application claims the benefit, under 35 U.S.C. § 119(e), of U.S. Provisional Patent Application No. 62/829,580, filed 4 Apr. 2019, which is incorporated herein by reference in its entirety.

TECHNICAL FIELD

The present disclosure relates generally to segment routing, and more particularly to applying attestation to segment routing.

BACKGROUND

In a network, data packets may be transmitted through one or more network elements (e.g., nodes or routers) before arriving at their destination. For example, data packets may be transmitted through a network that utilizes segment routing (SR) technology. SR may be utilized with both Multi-Protocol Label Switching (SR-MPLS) and Internet Protocol version 6 (SRv6) data-planes. In some circumstances, certain network elements of an SR network may become compromised. For example, an attacker may gain control of a router and direct traffic from the router to the attacker's computing device. In the event the attacker gains access to one or more network nodes, the attacker may tamper with the sensitive information transmitted through the compromised node.

DESCRIPTION OF EXAMPLE EMBODIMENTS

Overview

Figure 1:
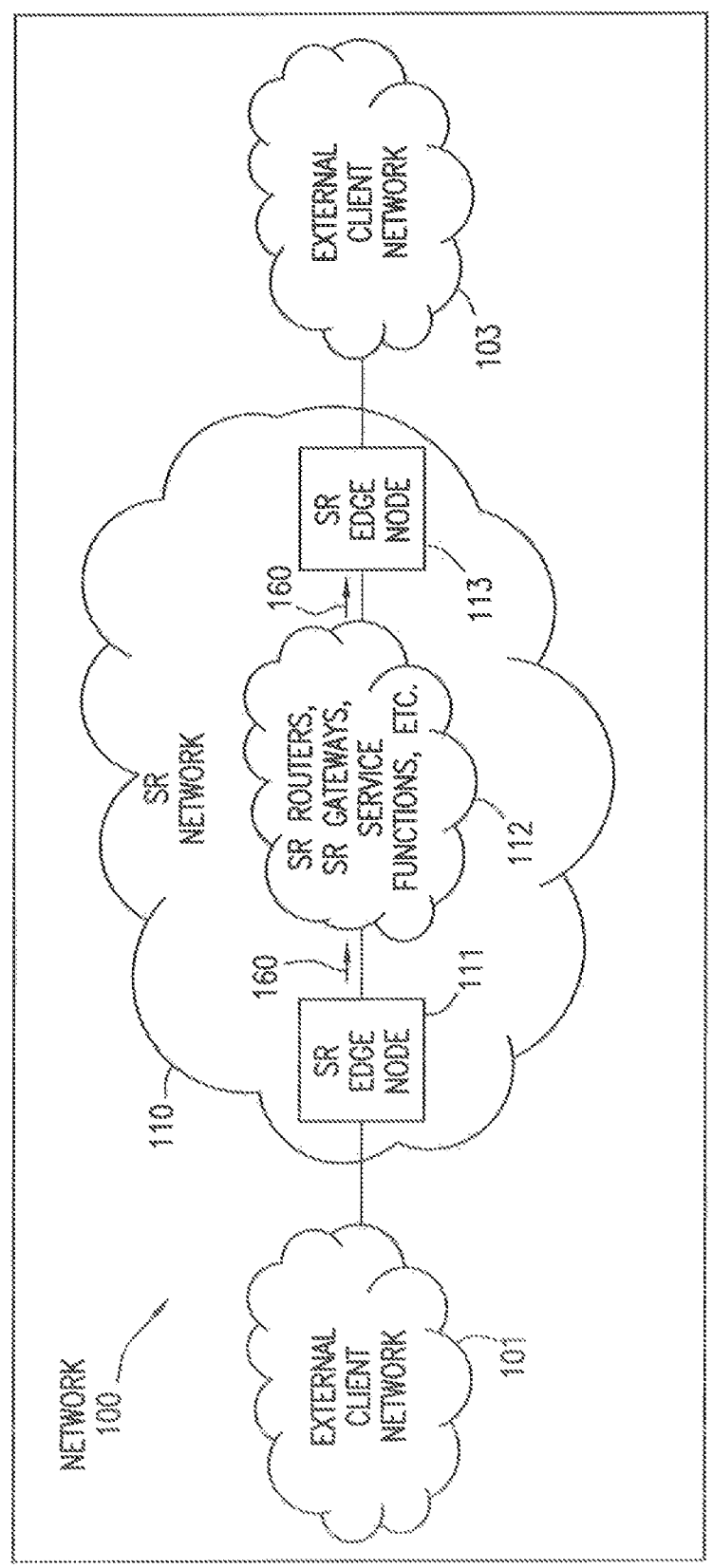
FIG. 1 illustrates a segment routing (SR) network, according to certain embodiments.

In a communications network, data packets may be transmitted through one or more network elements (e.g., routers) before arriving at their destination. In some networks, Segment Routing (SR) technology is utilized to transmit data packets through a network. Segment routing is typically used on top of either a Multi-Protocol Label Switching (SR-MPLS) network or on top of an Internet Protocol version 6 (SRv6) network. In an MPLS network, a header (also known as an MPLS label stack) is used to encode segments of the network. Under IPv6, a header known as a Segment Routing Header (SRH) is used to encoded segments of the network. Segments in an SRH are encoded in a list of IPv6 addresses.

In some situations, certain network elements in an SR network (e.g., an SR-MPLS or an SRv6 network) may become compromised. For example, an attacker may gain control of a router and direct traffic from the router to the attacker's computing device. In the event the attacker gains access to one or more network nodes, the attacker may tamper with the sensitive information transmitted through the compromised node.

Example Embodiments

To address these and other problems in networks that utilize segment routing, embodiments of the disclosure provide apparatuses, systems, methods, and computer-readable media for applying attestation to SR-MPLS and SRv6. In some embodiments, the attestation that is applied to SR-MPLS and SRv6 includes a token which may allow external entities to validate freshness of asserted data based on the state of internal counters within a Trusted Platform Module (TPM). The token or signed measurement may be referred herein as an attestation or a canary stamp (or simply "stamp") since a token or signed measurement may provide authenticity similar to a stamp and may be used as an early indicator of trouble. In some embodiments, the attestation is applied to SR-MPLS and SRv6 using a new Type/Length/Value (TLV) triplet. The TLV that includes the attestation may be transmitted to other network entities (e.g., other routers in the SR network) via an MPLS label or an IPv6 SRH.

Disclosed herein are, inter alia, methods, apparatus, computer-storage media, mechanisms, and means associated with a SR network element (e.g., router) receiving SR packets, updating SR headers to include an attestation (e.g., canary stamp) of the SR network element, and communicating data packets with the updated SR header that includes the attestation to another SR network element. As used herein, segment routing includes, but is not limited to, SRv6 and SR-MPLS. In some embodiments, headers used in SRv6 and SR-MPLS have been modified to include attestation of traversed network elements. In some embodiments, the attestation is carried in new TLV triplets within headers of SRv6 and SR-MPLS. In some embodiments, an SR router performs a method of applying attestation to SRv6 and SR-MPLS. In some embodiments, an SR endpoint performs a method of applying attestation to SRv6 and SR-MPLS. The included attestation provides verifiable evidence of the trustworthiness of SR network elements, thereby enabling other SR network elements to ascertain if any SR network element has been compromised (e.g., hacked or captured). This increases the security of the SR network and reduces or eliminates the possibility of sensitive information being stolen. These and other embodiments and benefits are discussed in more detail below in reference to the provided figures.

FIG. 1 illustrates a network 100, according to certain embodiments. As illustrated, network 100 includes client networks 101 and 103 (which may be the same network in some embodiments) external to SR network 110. SR network 110 includes SR edge nodes 111 and 113 and one or more communicatively-coupled network elements 112 (e.g., routers, SR gateways, service functions, etc.). In response to receiving a native packet, an SR edge node 111, 113 identifies an SR policy (e.g., list of segments) through or to which to forward an SR packet encapsulating the native packet. These policies can change in response to network conditions, network programming, etc. SR edge nodes 111 and 113 also decapsulate native packets from SR packets and forward the native packets into networks 101 and 103.

As used herein, segment routing or "SR" includes, but is not limited to, SRv6 and SR-MPLS. In one embodiment, segments (e.g., SRv6 SIDs or SR-MPLS segments) are advertised by an SR gateway on behalf of one or more service functions. In one embodiment, an SR-MPLS encapsulating header includes an MPLS label stack, with each label (e.g., MPLS SID) in the stack representing a segment. In one embodiment, an SRv6 encapsulating header includes an IPv6 header with an SR extension header containing a list of IPv6 addresses, each representing a segment. These segments are used to forward SR packets through an SR network, including to forward an SR packet to an SR gateway to have one or more services applied to a native packet encapsulated in the SR packet.

As discussed in more detail below, network elements 111-113 of SR network 110 apply attestation 160 to SR-MPLS and SRv6. In some embodiments, attestation 160 includes a token which may allow external entities to validate freshness of asserted data based on the state of internal counters within a TPM. In some embodiments, attestation 160 is provided by a TMP. Dedicated crypto-processors, such as a TPM, may take measurements necessary to attest the identity of a device and running binaries on the device. These measurements may include evidence that the device is in a known safe state. However, a receiver must be able to certify the evidence as fresh. Without a guarantee of freshness, an attacker may have an opening to inject previously recorded measurements, asserting what is replayed as being current. When sensitive information is being transmitted to a destination device through a network, network traffic should not be sent through comprised network nodes (e.g., hacked or captured nodes) to prevent leakage of or tampering with the sensitive information. However, traditional protections and link encryption are ineffectual to ensure that each router in the end to end path is not compromised specially when an attacker gains root access to a device via some exploit.

In particular embodiments, a first network node (e.g., SR edge node 111) may be configured to communicate using SR-MPLS or SRv6. SR edge node 11 may receive a native data packet from external client network 101. SR edge node 111 may add a header to the native data packet in order to transmit the native data packet through SR network 110. In order to verify the security or state of SR edge node 111, SR edge node 111 inserts attestation 160 within the header added to the native data packet. Attestation 160 may be for proving that SR edge node 111 is in a known safe state. In some embodiments, other network elements 112-113 may determine that the attestation 160 from SR edge node 111 is valid at a current time and may compute a trust level for SR edge node 111 based at least on the received attestation token 160. The trust level for SR edge node 111 may be used by other network elements 112-113 to compute a routing table of the network.

As described herein, verifiable evidence of device tampering (e.g., canary stamps) may be appended to interactions based on existing communication protocols. This may give evidence receivers the option of evaluating trustworthiness of the network device and reacting accordingly. For example, the evidence receiver may determine that it no longer trusts the network device and adjusts network policy to mitigate possible damage or potential security threats. Dedicated crypto-processors such as a TPM may take necessary measurements to attest the identity of a device and its running binaries. These measurements may include detecting evidence which indicates that the device is in a known safe state. However, a receiver may need to certify the evidence as fresh because, without a guarantee of freshness, an attacker may inject previously recorded measurements to make the receiver to assert what is replayed as being current.

Traditional systems and methods may identify or detect the replaying of old evidence via a nonce. For example, a nonce could be a random number provided by the entity making the request. This nonce may be passed into the TPM which may generate results including a signature based on the nonce which could not have been generated without providing that nonce. However, the nonce-based method may rely on the transactional challenge/response interaction model. In other words, the nonce-based method may not work with unidirectional communications originating from the attesting device. For example, a nonce may not work with an asynchronous push, multicast, broadcast messages, etc.

Particular embodiments of this disclosure may perform a unidirectional attestation which is applicable to, for example, an asynchronous push, multicast, broadcast messages, etc., for the authentication of the corresponding devices in conjunction with corresponding binaries. Particular embodiments may enable a communication platform to assess whether the peer platforms are trustworthy. For example, the system may perform a detection of invalid attestations that can trigger alarms/events reduction of network access from a suspect device. The communication platforms may be capable of supporting the unidirectional attestation mechanism. As an alternative approach for attesting freshness, particular embodiments of the system may generate a token which may allow external entities to validate freshness of asserted data based on the state of internal counters within the TPM. The token may allow the replay attacks to be detected without a nonce and make it possible for the attestation for asynchronous push, multicast, broadcast, etc. The token or signed measurement may be referred as a canary stamp since a token or signed measurement may provide authenticity like a stamp and may be used as an indicator of an early sign of trouble. Particular embodiments of the system may combine the token or signed measurement with TPM-integrated capabilities aimed at verifying that valid binary processes are running. The TMP-integrated capabilities may include, for example, but are not limited to, trusted execution environments (TEE) which may provide runtime malware protections and authenticated code modules (ACM) which may ensure that only digitally signed code modules can be loaded into a CPU. Particular embodiments of this disclosure may be implemented within a communication platform (e.g., a proprietary platform) or/and across multiple communication platforms (e.g., proprietary platforms and third-party platforms).

Particular embodiments of the system provide an advantageous technical solution for communication platforms to attest authenticity and allow a common unidirectional attestation framework to be applied across existing networking hardware as well as virtual routers. Particular embodiments of this disclosure may be applicable to, for example, but not limited to, Cisco Secure Boot, Linux Integrity Measurement Architecture (IMA), Intel's Trusted Execution Technology (TXT), etc., and may enable these platforms to validate that a processor is running known software with valid chain of binary signatures. Particular embodiments of the system may provide defining requirements fir the placement of different types of signed measurements (e.g., token or stamps) while allowing receivers to evaluate potential trustworthiness of attested information. Particular embodiments of the system may support controller-based evaluation of signed measurement (e.g., token or stamps) which includes subscription-based mechanisms to incrementally push information/evidence to be verified or/and beachhead use cases and platforms.

TPM functionality may be embedded in a wide variety of devices including mobile phones, PCs, routers, etc. While traditional TPM methods may enable a device to prove freshness in a replay to a response, these methods may not support unidirectional attestation. Particular embodiments of this disclosure may provide mechanisms for verifiable unidirectional attestation by creating and distributing a token. This token may link counters on an attesting device with one or more globally verifiable characteristics or parameters (e.g., a counter on a controller, a RADIUS server, or a time authority). Upon its creation, the token may be distributed freely to any number of receivers/verifiers. Upon receiving the token, a receiver may accept subsequently attested information (e.g., stamps) from a remote TPM and attest asynchronous push, multicast, or broadcast communications of a device. It is notable that, in this disclosure, the term "TPM" may be used as an umbrella term for the necessary functionality. The mechanisms described may be supported by one or more proprietary hardware and other hardware supporting the TPMv2 specification.

In particular embodiments, the system may create the initial token by extracting current counters from an attestee's TPM (e.g., either the local network element 120 or another network element 120), and hashing it with information from an external TPM. As a result, the system may generate a non-spoofable token which binds continuously incrementing counters on an attestee with some known external state. In particular embodiments, any resetting of the TPM counters may be visible in any subsequent TPM queries. Any restarting of platform may be exposed in subsequent TPM queries. Within these bounds of reset and restart, the TPM's counter time-tick may keep continuous increments. Therefore, the push of attestee TPM information which includes these three counters may be known to have occurred subsequently to any previously received measurement. On the other hand, if the reset and restart counters have not changed, the incremental time since any previous measurement may also be known. In particular embodiments, the system may validate device information asserted from outside the TPM's program configuration registers (PCR). The majority of information needing to be trusted by network peers may not be contained within the TPM's PCR. Particular embodiments of the system may provide indirect methods of validating that a device has not been compromised based on the data or processes of exiting systems or platforms.

A network may only be as secure as its weakest links, Information sent from a first device to a second device on the network may pass through multiple intermediary nodes or devices (e.g., routers, network controllers, etc.) before it reaches the target device. It is vitally important that transmitted information, especially when it includes sensitive material, should not be sent through compromised network nodes (e.g., hacked or captured nodes) to prevent leakage of or tampering with the sensitive information. However, as network size and complexity increase, the potential number of attack vectors for an attacker to exploit also grows. It may be difficult to determine with certainty whether each individual node through which an arbitrary piece of information may pass is secured without having a dramatic effect on the performance of the network. Moreover, if an attacker gains root access to a device (e.g., via some previously undetected exploit), traditional protections and link (e.g., in-transit) encryption may prove ineffectual at protecting any sensitive information.

Figure 2:
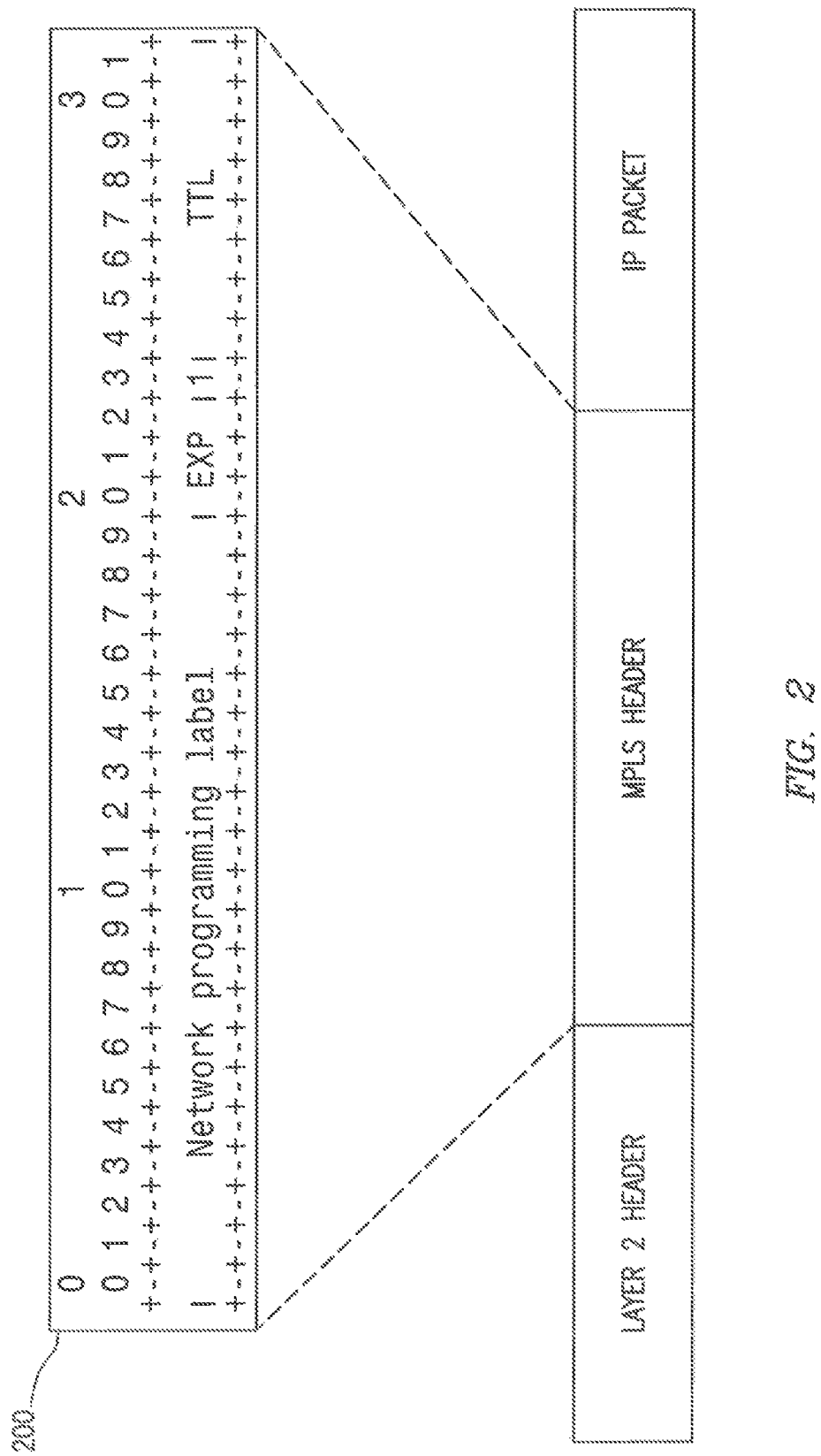
FIG. 2 illustrates a typical Multiprotocol Label Switching (MPLS) label stack entry containing an SR-MPLS Network Programming label, according to certain embodiments.

Particular embodiments may apply attestation in the context of security management at a network-level to determine in real-time whether a node in a network should be trusted. This disclosure introduces an asynchronous, unidirectional time-based variant of attestation that may allow other nodes in a network to reliably ascertain if a source that is routing information has been compromised. As previously discussed, the token used in this variant of attestation may be referred to as a "canary stamp" as it positively marks data as it transitions through the network and can indicate on a front-line basis whether any security problems may exist FIG. 2 illustrates a typical Multiprotocol Label Switching (MPLS) label stack entry 200 containing an SR-MPLS Network Programming label, according to certain embodiments. MPLS header label stack entry 200 includes a Network programming label that is set to 20 bits. An SR-MPLS Network Programming label is allocated from the Segment Routing Global Block (SRGB). The format of an MPLS label stack entry is defined in RFC3032. MPLS header label stack entry 200 also includes an EXP field which is a 3-bit Traffic Class field for QoS (quality of service) priority and ECN (Explicit Congestion Notification). MPLS header label stack entry 200 also includes a Bottom of Stack (BoS) bit and an 8-bit TTL (time to live) field. For more information on these fields of MPLS header label stack entry 200, please refer to Request for Comments (RFC) 3032.

Figures 3A, 3B:
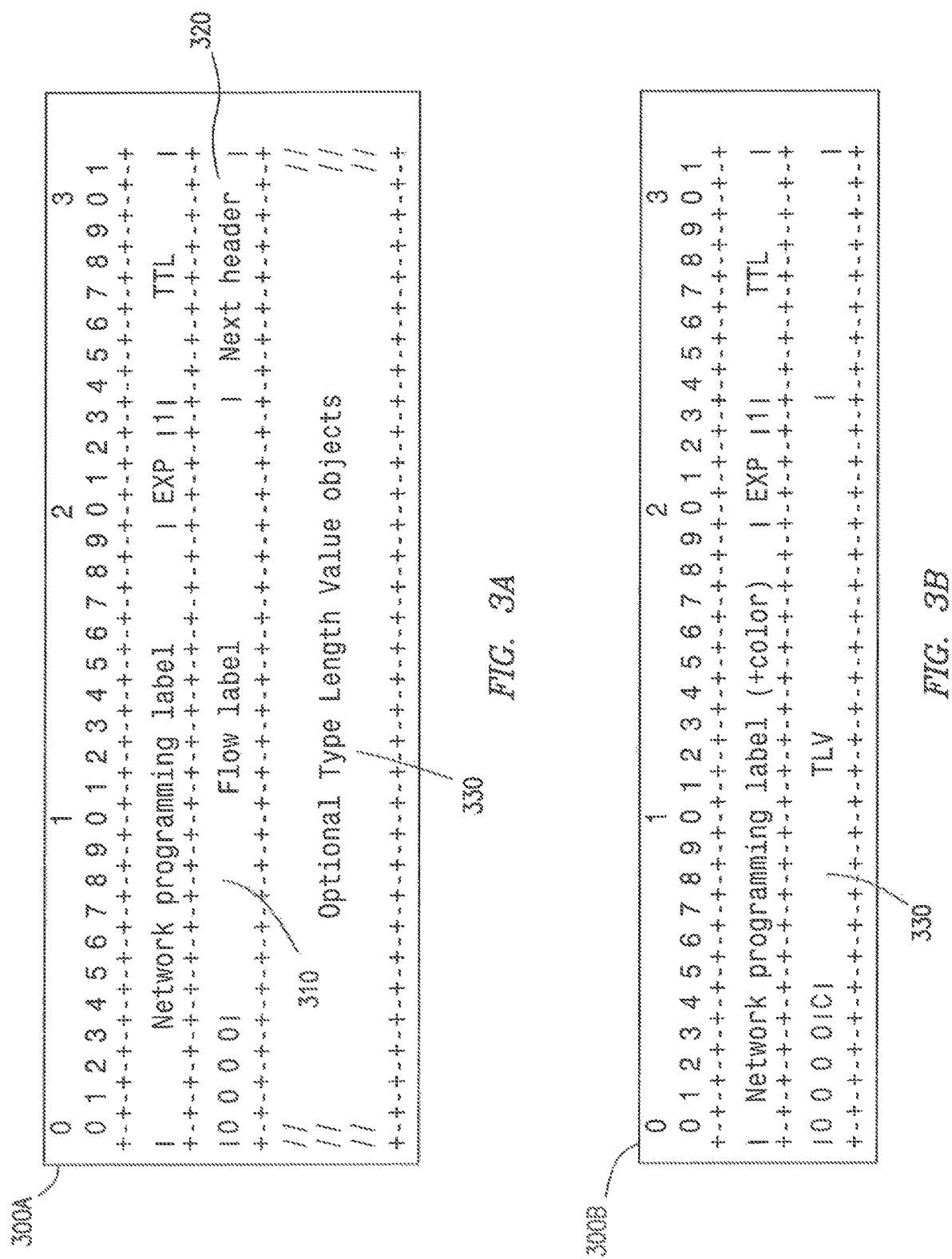
FIGS. 3A and 3B illustrate example SR-MPLS network programming headers with additional Type/Length/Value (TLV) triplets, according to certain embodiments.

FIGS. 3A and 3B illustrate example SR-MPLS network programming headers 300A and 300B that include additional fields such as Type/Length/Value (TLV) triplets, according to certain embodiments. In general, SR-MPLS network programming headers 300A and 300B differ from MPLS header label stack entry 200 in that they include extra fields to allow for the transport of additional information through SR network 110. For example, SR-MPLS network programming headers 300A and 300B may be used to transmit and collect attestations 160 (e.g., canary stamps) from SR network elements 111-113. In the illustrated embodiment of FIG. 3A, SR-MPLS network programming header 300A includes networking programming label, EXP, BoS, and TTL fields as described above in reference to FIG. 2. In addition to these fields, SR-MPLS network programming header 300A includes a 20-bit flow label field 310, which is similar to an IPv6 flow label, and an 8-bit next header field 320. Next header field 320 identifies the header that directly follows the current SR-MPLS header. Possible values for next header field 320 include the following: IPv4, IPv6, and MPLS (indicates that the label stack continues after this header.)

SR-MPLS network programming header 300A also includes optional TLV field 330, which may be a variable length and may contain any number of TLV objects. In some embodiments, optional TLV field 330 may leverage SRH TLVs. In some embodiments, the number and/or type of TLV objects in optional TLV field 330 is carried in the SIT) semantic associated to the Network Programming label (e.g., label 17010 could be allocated for "opaque metadata TLV," label 17020 for "canary stamp TLV" and label 17030 for "opaque metadata and canary stamp TLVs"). Possible TLVs carried in optional TLV field 330 include the following: attestation 160, opaque metadata (sec 7.2.1.1 of draft-ietf-spring-sr-service-programming), Network Service Header (NSH) carrier (sec 7.2.1.2 of draft-xuclad-spring-sr-service-programming), and in-situ Operations And Maintenance (IOAM). In certain embodiments, a "Total length" field of 1 octet may be inserted between next header field 320 and the first TLV of TLV field 330 such that the SID semantic only needs to express whether or not the SR-MPLS network programming header has TLVs attached to it.

The format for TLVs carried in TLV field 330 includes a type field, a length field, and a value field. The type field is typically a binary code that indicates the kind of field that this part of the message represents. In many cases, the type code for each type of TLV may be assigned by the Internet Assigned Numbers Authority (IANA) for interoperability. The length field defines the length of the value field in octets. The TLVs may also include nested TLVs or sub-TLVs. The TLV may be used to carry a variety of types of information. In particular embodiments, a canary stamp may be encoded in SR-MPLS or SRv6 as an attestation-focused TLV, as discussed in more detail herein.

In certain embodiments, SR network elements 111-113 such as an SR-MPLS node include additional capabilities beyond typical SR network elements. For example, some SR network elements include the capability of recognizing a particular label L (e.g., a particular SR-MPLS network programming header 300A) as a metadata label. Once identified as a metadata label, the SR-MPLS node may perform load-balancing based on the flow label and may read the attached TLV(s). If the particular label L is the top label, the SR-MPLS node may pop the network programming header (including L and any attached TLV), then continue the packet processing as per the "Next header" value.

In some embodiments, an SR-MPLS network programming segment is placed at the bottom of the MPLS label stack. If the SR-MPLS network programming segment is not placed at the bottom of the MPLS label stack, the Next header value is set to an appropriate value (e.g., as assigned by IANA) to indicate that more MPLS labels follow.

In some embodiments, an SR-MPLS network programming segment may not be associated with any forwarding equivalence class (FEC). In certain embodiments, when computing a load-balancing hash, the first SR-MPLS network programming segment in the label stack is searched for and, if present, its flow label is included in the load balancing hash. In certain embodiments, when processing a service segment that may benefit from metadata, the first SR-MPLS network programming segment in the label stack is searched for and, if present, relevant information in the attached TLVs is searched for. In certain embodiments, when the SR-MPLS network programming segment is at the top of the label stack, the SR-MPLS network programming header is popped and the remaining data is processed as indicated by the next header field 320.

FIG. 3B illustrates an example SR-MPLS network programming header 300B, which is a simplified version of SR-MPLS header 300A of FIG. 3A. The network programming label field of SR-MPLS network programming header 300B may be routed and/or may indicate metadata. In some embodiments, the TLV field of SR-MPLS network programming header 300B may contain a timestamp. In some embodiments, a color bit may be provided in SR-MPLS network programming header 300B.

SR-MPLS network programming headers 300A and 300B provide numerous advantages over traditional MPLS (LOP (RFC5036) or RSVP-TE (RFC3209)) or SR-MPLS (RFC8660). For example, SR-MPLS network programming headers 300A and 300B provide a pure SR solution for MPLS payload identification with no dependency on the Multiprotocol Label Switching Working Group (MPLS WG). In addition, SR-MPLS network programming headers 300A and 300B provide a pure SR solution for load-balancing/entropy with no dependency on MPLS WG. Furthermore, SR-MPLS network programming headers 300A and 300B add metadata carrying capabilities (e.g., canary stamp, service programming, IOAM, etc.

Figure 4:
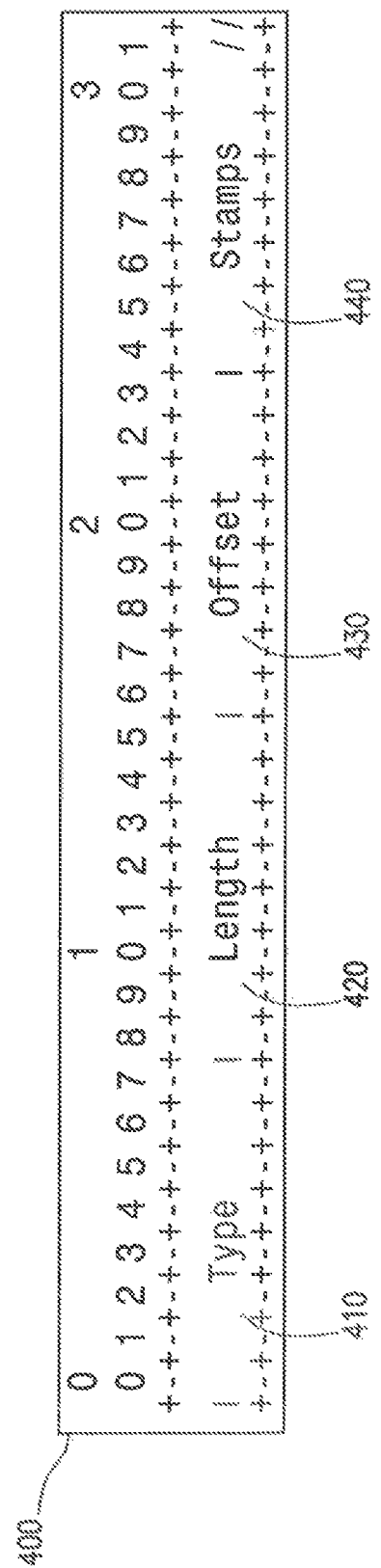
FIG. 4 illustrates a TLV object that may be utilized by various embodiments.
Figure 5:
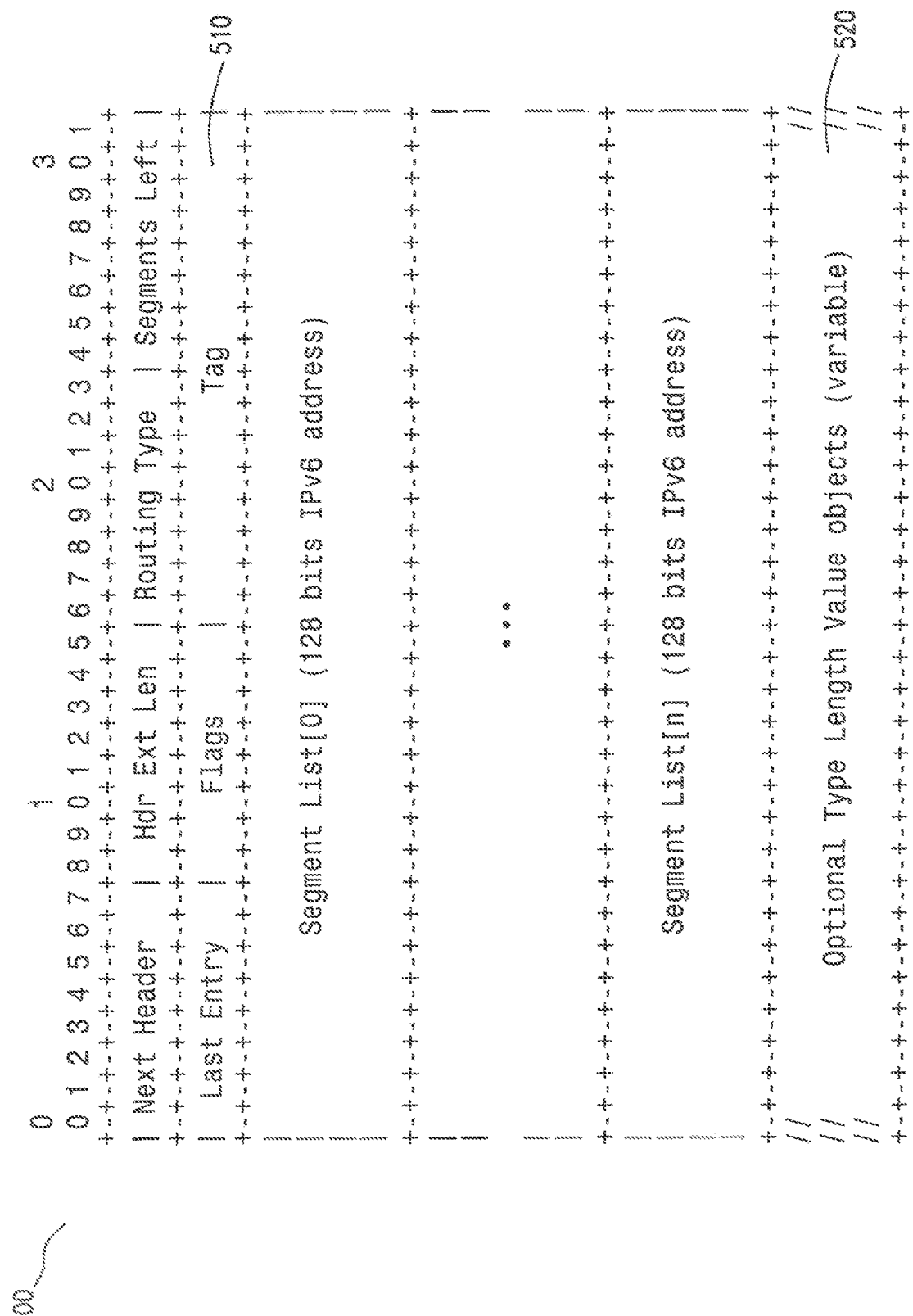
FIG. 5 illustrates a typical Internet IProtocol version 6 (IPv6) Segment Routing Header (SRH), according to certain embodiments.

FIG. 4 illustrates a TLV object 400 that can be used as part of the TLV list in either optional TLV field 330 of FIGS. 3A and 3B or optional TLV field 520 of FIG. 5, according to certain embodiments. The same TLV object format may be used for both SR-MPLS and SRv6. In certain embodiments, SR network elements 111-113 in SR network 110 collect the attestations 160 of all SR segment endpoints traversed by a packet during the packet's journey across the network. This collection leverages SR-MPLS network programming headers such as SR-MPLS network programming headers 300A and 300B. To accomplish this, the headend node may insert TLV object 400 with an empty stamp collection TLV of the format illustrated in FIG. 4. TLV object 400 may include a type field 410, a length field 420, an offset field 430, and stamps field 440. In some embodiments, type field 410 and length field 420 are similar to or identical to corresponding fields in typical TLVs. In some embodiments, the TLV length is set to 1 octet plus the size of k canary stamps (and plus any required padding for alignment in some embodiments), where k is the number of SIDs that are expected to be traversed in SR network 110. The number of SIDs that are expected to be traversed may equal the number of SIDs in the pushed SID-list, plus for each Binding-SID in the SID-list, the number of SIDs in the largest SID-list that will be pushed as part of the Binding-SID processing, recursively. A small margin (e.g., 2) may be added for Topology Independent Loop-Free Alternate (TI-LFA). In some embodiments, offset field 430 indicates a location within stamps field 440 in which to write an attestation 160 (e.g., canary stamp). Stamp field 440 includes attestations 160 from traversed SR network elements 111-113.

At each SID endpoint, the following packet processing may be performed using TLV object 400. First, the SID endpoint may pop the top label (active segment). The SID endpoint may then look for the stamp collection TLV at the bottom of the label stack. The SID endpoint may retrieve the current offset O from the offset field 430. The SID endpoint may retrieve an attestation 160 of the local node and write the local node's attestation 160 in stamp field 440 at offset O. The SID endpoint may increment the value in offset field 430 by the size of one canary stamp and continue the SID processing. As a result, the local node's attestation 160 may be transmitted to subsequent SR network elements, and the next SR network element will have the correct location as indicated in offset field 430 in which to write its own attestation 160.

FIG. 5 illustrates a typical IPv6 SRH 500, according to certain embodiments. SRH 500 includes fields such as a next header field, a routing type field, a flag field, a tag field 510, and an optional TLV field 520. The fields of SRH 500 are defined and described in more detail in the IPv6 Segment Routing Header (SRH) document (draft-ietf-6man-segment-routing-header). As described in more detail below in reference to FIGS. 6A and 6B, certain embodiments utilize SRH 500 to apply attestation to SRv6.

Figure 6A:
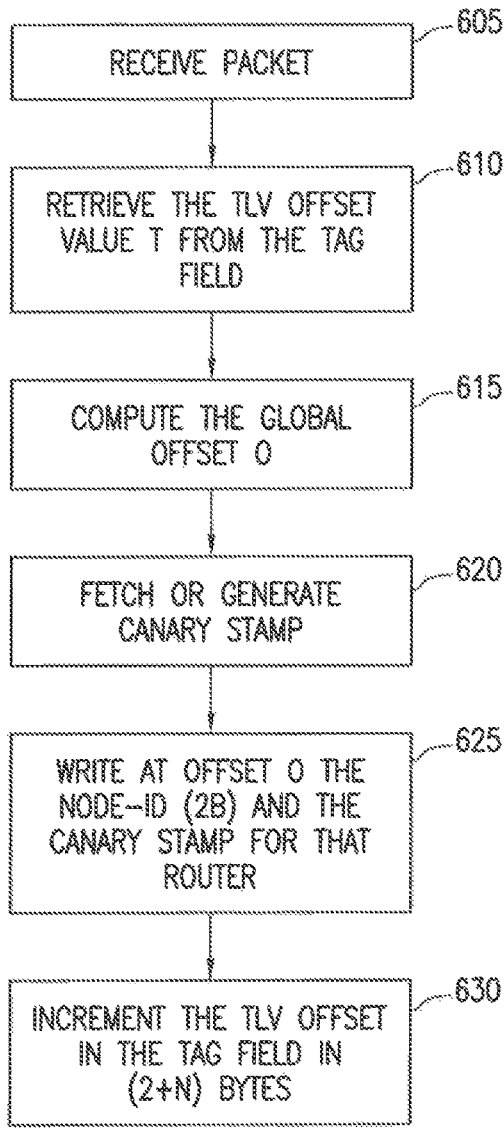
FIG. 6A illustrates a method by a router of applying attestation to Segment Routing over IPv6 (SRv6).

FIG. 6A illustrates a method 600A that a router of SR network 110 may utilize to apply attestation to SRv6. In general, SRv6 may be used by some embodiments to collect attestation 160 for any SR network element along the path in an inband manner. For example, routers in an SRv6 network 110 may collect the canary stamps of all routers along the packet path the network. A particular embodiment of a method 600A to support this is described in more detail below. This method allows SR network elements to write canary stamps at deep packet locations.

Method 600A may be performed by any appropriate SR network element (e.g., an SRv6 router) in SR network 110 to collect the canary stamp for any router along the path in an inband manner using SRv6. In some embodiments, as a process prior to method 600A, an application maintains an active (open) TCP socket. An agent hooked on the socket inserts every predetermined number of packets (e.g. 1000) an SRH with a tag value (e.g., tag field 510) and a large empty TLV (inband packet) (e.g., in TLV field 520). In some embodiments, tag field 510 is initially set to zero. Each monitoring-enabled router may be configured with a DSCP matching rule for an OAM bit. Method 600A may then begin in step 605 where a data packet is received. Upon receiving a packet in step 605, if the OAM bit is set, then the following actions may be performed. At step 610, method 600A inspects the SRH and retrieves the TLV offset value T from tag field 520. At step 615, method 600A computes the global offset O. In some embodiments, O is computed in step 615 as O=C+8+(LE+1)*16+2+T, where: C is the current packet offset (beginning of the SRH); 8 bytes is the length of the fixed SRH fields; LE is the SRH Last Entry value; and 2 bytes is the length of the fixed TLV fields.

At step 620, method 600A fetches or generates attestation 160 for the local SR network element. At step 625, method 600A writes at offset O (computed in step 615) the node-id of the SR network element (e.g., 2 bytes) and the attestation 160 for that router (N bytes) from step 620. At step 630, method 600A increments the TLV offset in tag field 510 by (2+N) bytes.

In some embodiments, none of the SR Endpoints that perform method 600A perform PSP. In some embodiments, method 600A may also include writing an interface-id as well as a timestamp in TLV field 520 in order to provide hardware tracing features integrated with the canary stamp.

Particular embodiments may repeat one or more steps of the method of FIG. 6A, where appropriate. Although this disclosure describes and illustrates particular steps of the method of FIG. 6A as occurring in a particular order, this disclosure contemplates any suitable steps of the method of FIG. 6A occurring in any suitable order. Moreover, although this disclosure describes and illustrates an example method for apply attestation to SRv6 including the particular steps of the method of FIG. 6A, this disclosure contemplates any suitable method for apply attestation to SRv6 including any suitable steps, which may include all, some, or none of the steps of the method of FIG. 6A, where appropriate. Furthermore, although this disclosure describes and illustrates particular components, devices, or systems carrying out particular steps of the method of FIG. 6A, this disclosure contemplates any suitable combination of any suitable components, devices, or systems carrying out any suitable steps of the method of FIG. 6A.

FIG. 6I illustrates a method 600B that an SR endpoint of SR network 110 may utilize to apply attestation to SRv6. In some embodiments, method 600B may be performed by each particular segment endpoint in SR network 110 in order to insert a canary stamp for the particular segment endpoint. This method allows SR network elements to write canary stamps at deep packet locations. In some embodiments, as a process prior to method 600B, a source SR node (e.g., router) inserts SRH 500 with a new empty TLV. The TLV has the size of N canary stamps, where N is the number of segments in the SRH. Method 600B may then begin in step 635 where a data packet is received. At step 640, method 6003 determines the current packet offset C, which is the beginning of the SRH. At step 645, method 600B determines the SRH last entry value LE from SRH 500. At step 650, method 600B determines the SRH segment left value SL from SRH 500. At step 655, method 600B fetches or generates attestation 160 for the SR endpoint. At step 660, method 600B determines the size of the attestation 160 of step 655 in bytes. At step 665, method 600B calculates a TLV offset using the current packet offset C of step 640, the SRH last entry value LE of step 645, the SRH segment left value SL from step 6550, and the size of the attestation 160 of step 660. In some embodiments, the TLV offset O is computed in step 665 as O=C+8+(LE+1)*16+2+(LE-SL)*sizeof(stamp). At step 670, method 600B writes attestation 160 for the SR endpoint in SRH 500 at the computed TLV offset O calculated in step 665. After step 670, method 600B may end.

Figure 6B:
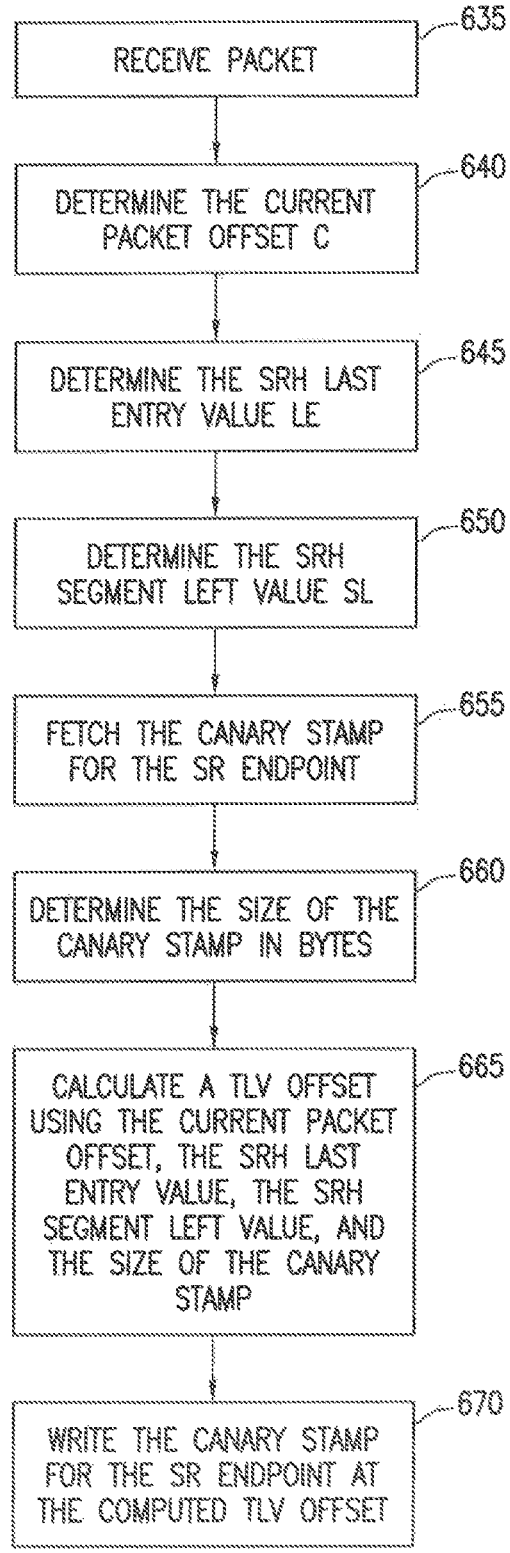
FIG. 6B illustrates a method by an SR endpoint of applying attestation to SRv6.

Particular embodiments may repeat one or more steps of the method of FIG. 6B, where appropriate. Although this disclosure describes and illustrates particular steps of the method of FIG. 6B as occurring in a particular order, this disclosure contemplates any suitable steps of the method of FIG. 6B occurring in any suitable order. Moreover, although this disclosure describes and illustrates an example method for apply attestation to SRv6 including the particular steps of the method of FIG. 6B, this disclosure contemplates any suitable method for apply attestation to SRv6 including any suitable steps, which may include all, some, or none of the steps of the method of FIG. 6B, where appropriate. Furthermore, although this disclosure describes and illustrates particular components, devices, or systems carrying out particular steps of the method of FIG. 6B, this disclosure contemplates any suitable combination of any suitable components, devices, or systems carrying out any suitable steps of the method of FIG. 6B.

Figure 7:
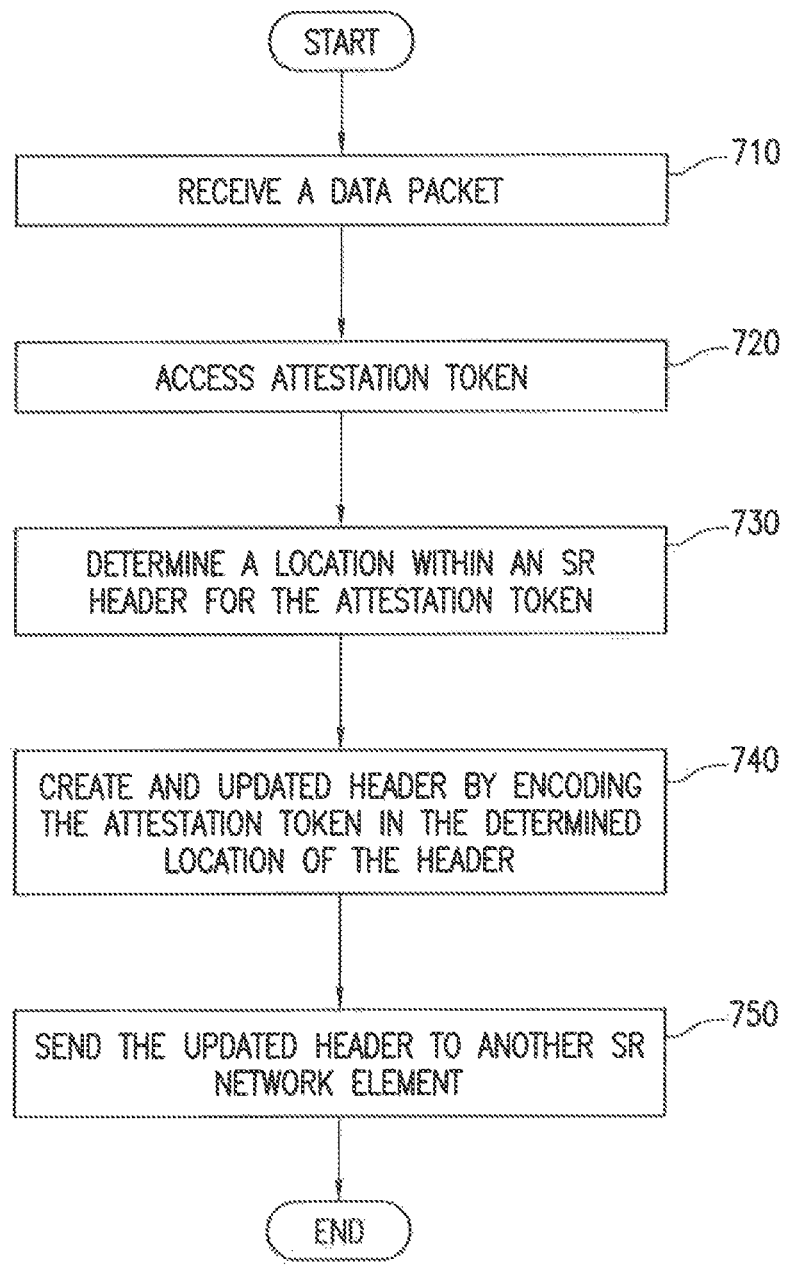
FIG. 7 illustrates a method of applying attestation to SR-MPLS, according to certain embodiments.

FIG. 7 illustrates a method 700 of applying attestation to SR-MPLS, according to certain embodiments. Method 700 may begin at step 710 where a data packet is received. In some embodiments, the data packet is an SR-MPLS or SRv6 data packet that is received at an SR network element such as a router or SR endpoint. At step 720, method 700 accesses or otherwise generates an attestation token. In some embodiments, the attestation token is attestation 160. In some embodiments, the attestation token is generated by a crypto-processor of the local SR network element.

At step 730, method 700 determines a location within a header of the received data packet to write the attestation token. In some embodiments, the header is an MPLS header or an IPv6 SRH. In some embodiments, determining a location within a header of the received data packet for the attestation token includes computing a new offset value using an existing offset value stored in the header. In some embodiments, step 730 includes the steps described above in reference to step 615 of FIG. 6A or step 665 of FIG. 6B.

At step 740, method 700 creates an updated header by encoding the attestation token of step 720 in the determined location of the header of step 730. In some embodiments, step 740 includes writing the attestation token in a TLV within the header. At step 750, method 700 sends the updated header with the encoded attestation token to another apparatus of the SR network. After step 740, method 700 may end.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for apply attestation to SR-MPLS including the particular steps of the method of FIG. 7, this disclosure contemplates any suitable method for apply attestation to SR-MPLS including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
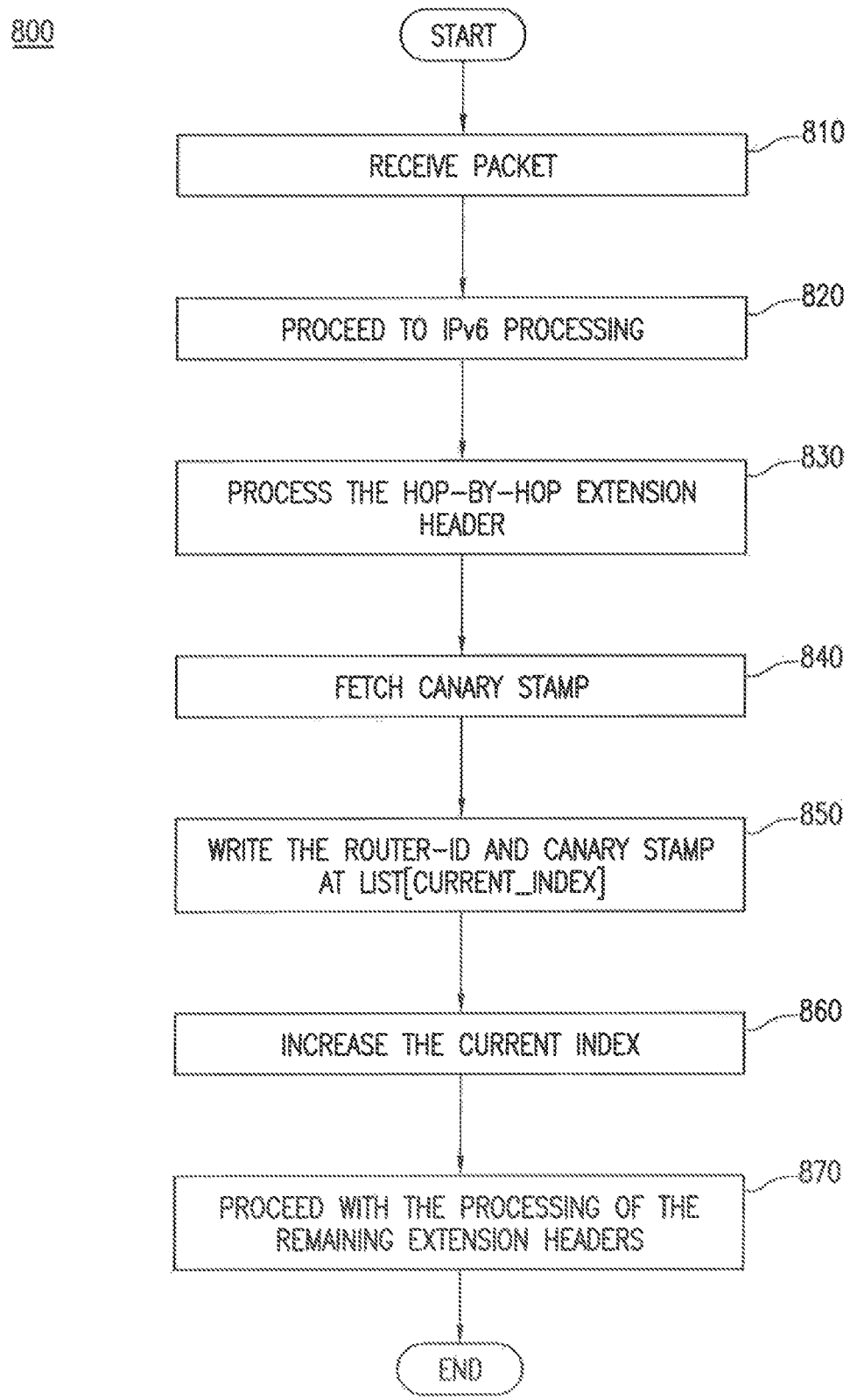
FIG. 8 illustrates a method of applying attestation to the IPv6 hop-by-hop extension header, according to certain embodiments.

FIG. 8 illustrates a method 800 of applying attestation to the IPv6 hop-by-hop extension header, according to certain embodiments. Method 800 may be performed by any appropriate SR network element (e.g., a router) in SR network 110 to collect the canary stamp for any router along the path in an inband manner using IPv6. In some embodiments, as a process prior to method 800, an application maintains an active (open) TCP socket. An agent hooked on the socket inserts every predetermined number of packets (e.g. 1000) an IPv6 hop-by-hop extension header with an option that includes a large empty TLV. In some embodiments, the hop-by-hop extension header contains the current index (initialized to zero) and an empty canary stamp list that will hold the router-IDs and canary stamps. Method 800, which may be performed by router N, may then begin in step 8110 where a data packet is received. At step 820, method 800 proceeds to IPv6 processing. As part of this process, the router will go through the hop-by-hop extension header according to typical RFC8200 behavior and proceed to process the hop-by-hop extension header in step 830. At step 840, method 800 fetches or otherwise generates attestation token 160 for itself (router N). At step 850, method 800 write the Router-id of itself (router N) and the attestation token 160 of step 840 at list[current_index]. At step 860, method 800 increases the current index and then proceeds with the processing of the remaining extension headers in step 870. After step 870, method 800 may end.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for applying attestation to the IPv6 hop-by-hop extension header including the particular steps of the method of FIG. 8, this disclosure contemplates any suitable method for applying attestation to the IPv6 hop-by-hop extension header including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
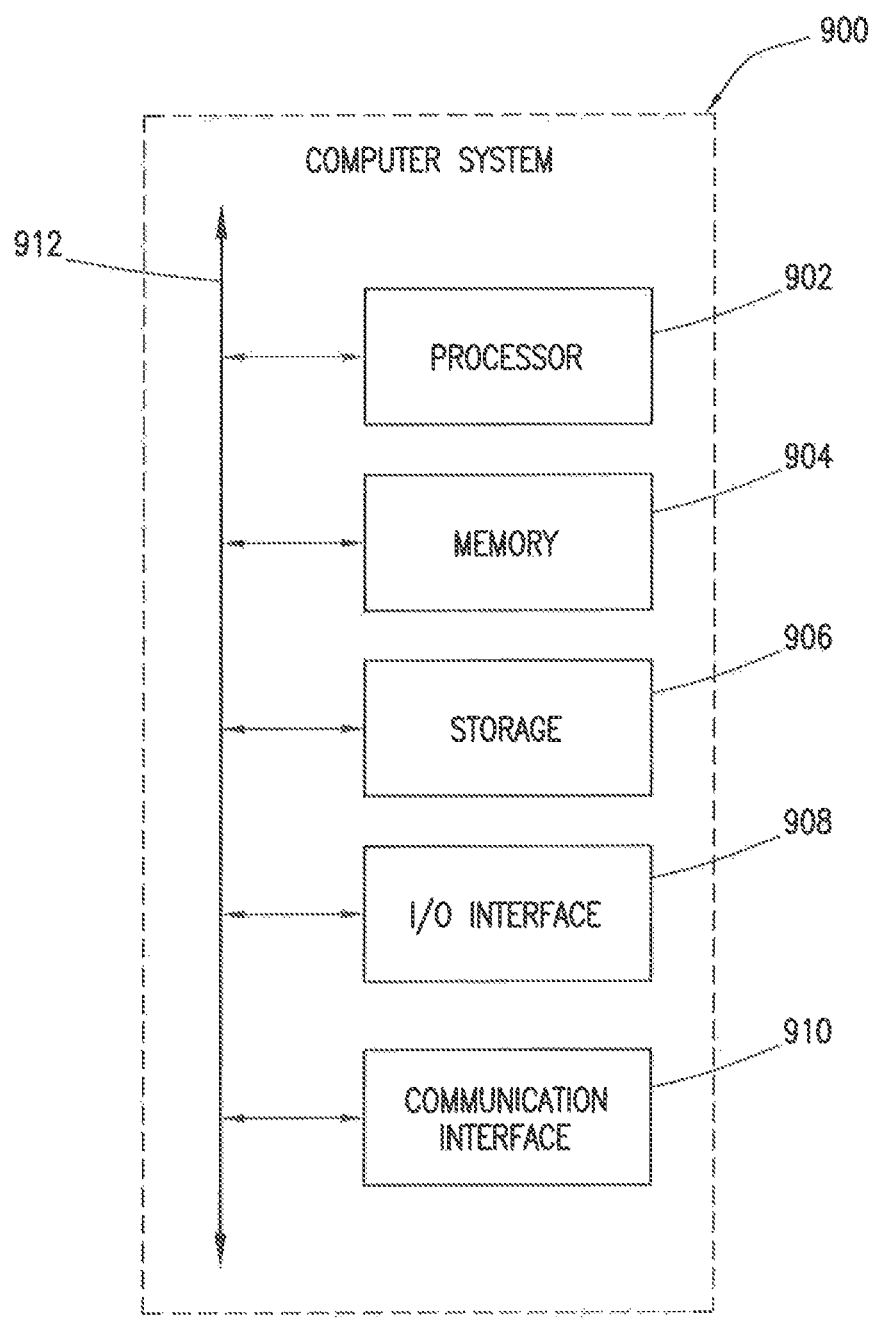
FIG. 9 illustrates an example computer system, according to certain embodiments.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. An apparatus of a segment routing (SR) network, the apparatus comprising:
    one or more processors; and
    one or more non-transitory computer-readable storage media coupled to the one or more processors and comprising instructions operable when executed by the one or more processors to cause the one or more processors to perform operations comprising:
        receiving a data packet;
        accessing an attestation token for the apparatus;
        determining a location within a header of the received data packet for the attestation token;
        creating an updated header by encoding the attestation token in the determined location of the header, wherein encoding the attestation token in the determined location of the header comprises writing the attestation token in a Type-Length-Value (TLV); and
        sending the updated header with the encoded attestation token to another apparatus of the SR network.

2. The apparatus of claim 1, wherein the apparatus of the SR network comprises a router or an SR endpoint.

3. The apparatus of claim 1, wherein the attestation token is generated by a crypto-processor of the apparatus.

4. The apparatus of claim 1, wherein the SR network is a Segment Routing—Multiprotocol Label Switching (SR-MPLS) network.

5. The apparatus of claim 1, wherein the SR network is a Segment Routing over IPv6 (SRv6) network.

6. The apparatus of claim 1, wherein:
    determining the location within a header of the received data packet for the attestation token comprises computing a new offset value using an existing offset value stored in the header; and
    creating the updated header comprises writing the new offset value in the header.

7. A method by an apparatus of a segment routing (SR) network, the method comprising:
    receiving a data packet;
    accessing an attestation token for the apparatus;
    determining a location within a header of the received data packet for the attestation token;
    creating an updated header by encoding the attestation token in the determined location of the header, wherein encoding the attestation token in the determined location of the header comprises writing the attestation token in a Type-Length-Value (TLV); and
    sending the updated header with the encoded attestation token to another apparatus of the SR network.

8. The method of claim 7, wherein the apparatus of the SR network comprises a router or an SR endpoint.

9. The method of claim 7, wherein the attestation token is generated by a crypto-processor of the apparatus.

10. The method of claim 7, wherein the SR network is a Segment Routing—Multiprotocol Label Switching (SR-MPLS) network.

11. The method of claim 7, wherein the SR network is a Segment Routing over IPv6 (SRv6) network.

12. The method of claim 7, wherein:
    determining the location within a header of the received data packet for the attestation token comprises computing a new offset value using an existing offset value stored in the header; and
    creating the updated header comprises writing the new offset value in the header.

13. One or more non-transitory computer-readable storage media embodying software that is operable when executed to:
    receive a data packet at an apparatus of a segment routing (SR) network;
    access an attestation token for the apparatus;
    determine a location within a header of the received data packet for the attestation token, wherein determining the location within the header of the received data packet for the attestation token comprises computing a new offset value using an existing offset value stored in the header;
    create an updated header by encoding the attestation token in the determined location of the header, wherein creating the updated header comprises writing the new offset value in the header; and
    send the updated header with the encoded attestation token to another apparatus of the SR network.

14. The one or more non-transitory computer-readable storage media of claim 13, wherein the apparatus of the SR network comprises a router or an SR endpoint.

15. The one or more non-transitory computer-readable storage media of claim 13, wherein the attestation token is generated by a crypto-processor of the apparatus.

16. The one or more non-transitory computer-readable storage media of claim 15, wherein encoding the attestation token in the determined location of the header comprises writing the attestation token in a Type-Length-Value (TLV).

17. The one or more non-transitory computer-readable storage media of claim 15, wherein the SR network is a Segment Routing—Multiprotocol Label Switching (SR-MPLS) network or a Segment Routing over IPv6 (SRv6) network.

* * * * *